United States Patent [19]

Grucza

[11] 4,042,552
[45] * Aug. 16, 1977

[54] COMPOSITION FOR HYDROPHILIC LENS BLANK AND METHOD OF CASTING

[75] Inventor: Bernard J. Grucza, Buffalo, N.Y.

[73] Assignee: Warner-Lambert Company, Morris Plains, N.J.

[ * ] Notice: The portion of the term of this patent subsequent to Apr. 30, 1991, has been disclaimed.

[21] Appl. No.: 631,997

[22] Filed: Nov. 14, 1975

Related U.S. Application Data

[60] Continuation of Ser. No. 419,228, Nov. 27, 1973, abandoned, which is a division of Ser. No. 290,376, Sept. 19, 1972, Pat. No. 3,807,398.

[51] Int. Cl.$^2$ ............................................. C08L 33/10
[52] U.S. Cl. .................. 260/29.6 RB; 260/29.6 WB; 260/29.6 RW; 260/29.6 E; 260/45.95 E; 260/885
[58] Field of Search ............... 260/29.6 RB, 29.6 WB, 260/29.6 RW, 29.6 E, 45.95 E, 885

[56] References Cited

U.S. PATENT DOCUMENTS

| 2,232,785 | 2/1941 | Howk | 260/45.95 |
|---|---|---|---|
| 2,848,443 | 8/1958 | Sperberg | 260/45.95 |
| 3,691,261 | 9/1972 | Cusano et al. | 260/29.6 |
| 3,700,761 | 10/1972 | O'Driscoll et al. | 264/1 |
| 3,721,657 | 3/1973 | Seiderman | 260/885 |
| 3,770,683 | 11/1973 | Barabas et al. | 260/885 |

Primary Examiner—M. J. Welsh

[57] ABSTRACT

Improvements in the O'Driscoll et al. U.S. Pat. No. 3,700,761 composition consisting of regulating critical proportions of PVP, HEMA, MA, EDMA, Water and the first and second stage initiators for producing hydrophilic lens blanks from which reproducible and predictable hydrated lenses are obtained with ratios of acceptance of 95 – 98%, to dimensional standards between the grinding dry and hydrated wet states and with ratios of resisting dimensional change in wet storage of upwards of ninety five percent. Compositions lying outside of the critical ranges of proportions provide lenses which are unpredictable (90% rejection) drift in size and do not provide reproducibility between dry and wet states and thereby create fitting problems. Critical ratios of MA to EDMA lying between 2.5/3.2 at 15% PVP content down to 1/1 at 28% PVP content provide reproducibility and predictability dry-to-wet and the optimum ratio is 1.5/0.7 at 20% PVP (reagents containing less than 1% water). Further improvement is made in the method of casting and cutting of U.S. Pat. No. 3,700,761, in which there is used a disposable mold of Teflon, high-density polyethylene or of RTV Silicone material with break-away curved bottom which is discarded to provide a convex surface requiring no cutting thereby eliminating many cutting and grinding steps on the conventional hard-lens lathe. Water-soluble medicaments as in U.S. Pat. No. 3,700,761 can be added to precision-cut eye bandages by dissolving in $H_2O$ and adding a total of 5% $H_2O$ to HEMA or the medicament can be used in eye drops, the bandage with 5% added containing 65% $H_2O$ instead of 60%.

1 Claim, 11 Drawing Figures

COMPOSITION FOR HYDROPHILIC LENS BLANK AND METHOD OF CASTING

This is a continuation of application Ser. No. 419,228, filed Nov. 27, 1973, now abandoned, which in turn is a divisional application of Ser. No. 290,376, filed Sept. 19, 1972, now U.S. Pat. No. 3,807,398.

BACKGROUND OF THE INVENTION

In O'Driscoll et al., U.S. Pat. No. 3,700,761, compositions consisting of HEMA (hydroxyethyl methacrylate) or HPMA (hydroxypropyl methacrylate) with PVP in proportions of 20 – 45%, with up to 1% MA and with about 0.2% EDMA were disclosed. Low and critical ranges of proportions of first stage initiators are thermally decomposed at 40°– 60° to provide solid buttons which after second stage curing at 110°C radiation curing and hydration provide remarkably high water content of about 50 – 65% in lenses which are cut when dry on both convex and concave surfaces on the conventional hard-lens lathe after the step of radiation curing.

SUMMARY OF THE INVENTION

The present invention is an improvement of the initial step of the method of preparing the hygroscopic lens in the dry state and depends upon the casting of the lens after a critical induction period in a break-away curved-bottom plastic mold in static condition from the liquid mixture of ingredients in critical proportions and under controlled temperature and inhibitor concentration conditions which prevent heat transfer through the mold so that an improved anistropic lens is produced which has predictable and reproducible characteristics. This anisotropic lens of the present invention is characteristics. This anisotropic lens of the present invention is characterized by different swelling and expansion between dry and wet states in the lateral direction and in the vertical direction but these changes are now reproducible and predictable to match diameters and steepeness of the cross-section and thereby assure a substantially rigid and accurate fit to the eye without drift in diameter or slope or stiffness and to provide long-time and precision correction of the optical condition.

As a result of the swelling, and uniquely due to the very high water uptake (50 – 65%), the lens made by the method of the present invention is found to shape itself by evaporation forces, in an unusual manner to steepen the vault or slope of the lens closely resting on the cornea and sclera of the eye, shaping being similar to that of hard-lens memory characteristics. In contrast to all other types of soft lenses commercially available, reproducibility and predictability are achieved by the critically controlled amounts of PVP, HEMA, EDMA, MA, Water and inhibitor which is used to stabilize the HEMA and which will produce a lens having 50 – 65% in the saline-stored condition.

In the eye, the lens drops in water content from 55 – 65% down to 45 – 55%. Surprisingly, the higher amount of water retained in the lenses in saline drops to the lower value in from thirty seconds to two minutes after insertion into the eye. This water content drop-off from about 50 – 65% occurs in most patients to a value of about 45 – 50%. The variations mentioned are found in testing hundreds of patients whose eye conditions varied from "wet eye" to "dry eye" as it is known in the art.

It was discovered that this evaporation which occurs provides a slight difference in the shape of the lens which results in a natural astigmatic condition which contributes in a new way to accurate fitting based on the secure adhesion to the limbal area, or areas of the lens rim which contract the tighten on the corneal center so that this contraction effects a closer fit, in cantilever fashion, and prevents dislodging movements of the lens away from the scleral area. The larger contact rim of the semi-rigid, rubbery lens water-laden with precise dimensional predictability, is uniquely aided for fitting of the entire scleral area and based upon the geometry of the limbal area of the lens, serves to confine the individual's own tears beneath the lens. This aids in the interchange of tear fluid, oxygen and carbon dioxide, all essential to corneal respiration. The steepness of the vault permits accurate centering on the cornea while the circulation of tear fluid permits a respiration result comparable to that due to the permeability of the cornea itself, and this permeability is based upon the high $O_2$ & $CO_2$ permeability of the lens material.

In accordance with the invention, the casting against the curved shape of a disposable mold permits a range of dry lenses for fitting eyes of all dimensions and the range is based upon a simplified manufacturing procedure, using a break-away mold bottom eliminating the grinding of the cast surface while providing a simple number of base curves (5) and a simple number of diameters (5) to true and time-stable dimensions in $x$, $y$ and $z$ planes.

BRIEF DESCRIPTION OF THE DRAWINGS

The invention is further illustrated in the drawings in which:

FIG. 6 shows the dimensions of rim cut lense of the type shown in FIG. 5.

DESCRIPTION OF THE PREFERRED EMBODIMENTS

Figure 1:
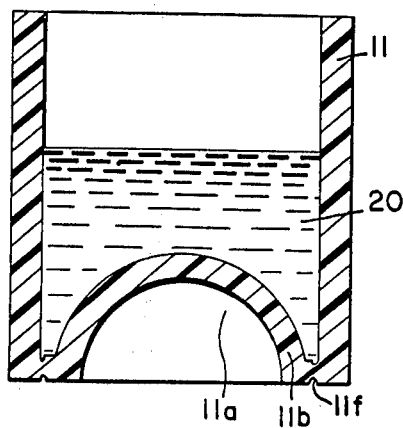
FIG. 1 is a sectional view which shows a break-away mold with curved bottom into which the composition is cast and polymerized against a curved inner-surface which surface requires no further grinding or polishing.

The accuracy of manufacture of the present invention is based upon the discovery that critical proportions are required of PVP, Ma, EDMA, Water with the initiator amounts used for first and second stage initiation of the Driscoll U.S. Pat. No. 3,700,761, and that initial amounts of hydroquinone stabilizer are required to assure storage stability and to give predictability and reproducibility between dry and wet states, these initial amounts permit economy, safety, and reliability in supply and in fitting. The example and drawings illustrate an improved method, based upon the discovery of first stage initiation which must be carried out in a preliminary induction stage at room temperature and which requires that the liquid mixture in static condition in the mold of FIG. 1, subjected to a room temperature stage for the conversion of mobile liquid to stringy liquid at a temperature between 15°– 30° C for 2½ – 6 hours, the longer time being required at the lower temperature. This induction period in the static mold of FIG. 1, must be carried out before the first stage initiation under thermal decomposition (40° – 60° C) which decomposed the rest of the initiator and changes the thickened liquid into a transparent solid button. Only when this first stage polymerization is broken down into two stages; first, a quiescent room temperature induction stage at 15° – 30°C and then a thermal stage at 40° for four hours or longer can the chain length of the copolymer grafted onto the PVP be brought up in uniformity, density, etc., up to the necessary length chains which will provide the necessary balance and semi-rigid, highly extensible and brittle properties of the rigid dry polymer. This dry power is subjected to further high temperature polymerization, as taught in the O'Driscoll Patent after the first stage without removing from the mold and this second stage is essential to impart hardness and brittleness which creates a button that can be ground to a tolerance of .01 millimeters and will maintain its shape after hydration regardless of the shape of eye to which it is applied. In short, the improvement of the present invention controls opposite properties in the contact lens of rubberiness, rigidly, hardness for grinding, dimensional stability and reproducibility in a new and unusual manner by controlling the time for chain growth during a preliminary induction period prior to rapid first stage initiation which occurs in at least four hours at 40° C in the oven and in the mold.

All of the ingredients — HEMA, EDMA, HPMA, MA, $H_2O$ and inhibitor (HQ or MEHQ) control the chain growth with given initiators. However, a critical element for the achievement of storage stability of the lens in the wet state is the requirement that no more than one hundred parts per million (preferably 60 – 80 parts per million) of hydroquinone-type inhibitor, used exclusively with HEMA, such as hydroquinone (HQ) or mono-methyl ether of hydroquinone (MEHQ). It was unexpected to discover that more than 100 parts per million of HQ inhibitor in HEMA would cause drifting, spreading and an increase in size of the diameter with decreased steepness of lenses which were placed in storage in isontonic saline for long periods of time (2 weeks to 6 months). In short, only those compositions in which the inhibitor content is controlled within critical limits of less than one hundred parts per million based upon the HEMA monomer can provide lenses which can be stored in the wet state for weeks or for several months or up to a year without increasing the critical dimensions of diameter and slope.

IMPROVED MANUFACTURING PROCEDURE ILLUSTRATED IN THE DRAWINGS

Reference is made to the manufacturing procedure which was illustrated and described in O'Driscoll et al., U.S. Pat. No. 3,700,761, wherein hard-lens cutting and polishing technology was used (see FIGS. 4a, 4b, 4c, & 4d) after the button was pushed under pressure and moved out of the Teflon cylindrical mold with the ram 13 in contact with the planar top of the button.

The present disposible mold 11 with break-away curved bottom 11b is shown in FIG. 1 as being filled with the polymerizable composition 20 which hardens in static condition through the room-temperature induction stage (2 ½ – 6 hours) of the present invention (see examples below), the first stage initiation under thermal break down of first initiator to assume the solid state in rubbery condition (40° – 60 C), the second stage under thermal break-down of second initiator (110°C – 1 ½ – 4 hours).

Figure 4A:
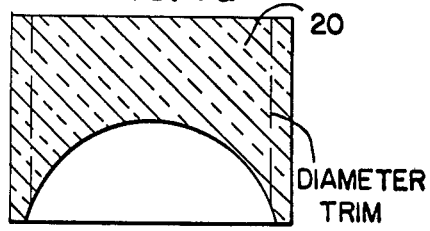
FIG. 4a shows the diagrammatic stage of cutting on the lathe as shown in diagrammatic form in FIG. 5.
Figure 4B:
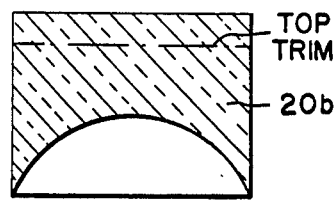
FIG. 4b shows the second stage.
Figure 4C:
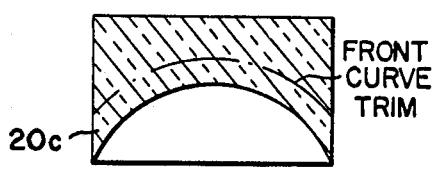
FIG. 4c shows the third stage of cutting.
Figure 4D:

Not until the final cut is made in the form shown in FIG. 4 and rimming is accomplished to provide doublegauged (inner and outer sphericities inspected) lens 20 as shown in FIG. 4d is the lens ready for the radiation post curing step. In the present invention the compositions made by the new method of bottom ejection of the button permit eliminating all cutting operations from the back (curved concave surface) of the lens 20e and more important, provide a superior lens which resists breakage since cutting inherently introduces microscopic scratches which act as stress points, initiating cracking and tearing. Eliminating all stress points on the inner-surfaces provides a stronger, longerwearing, more tear-resistant lens in hydrated condition.

Figure 2:
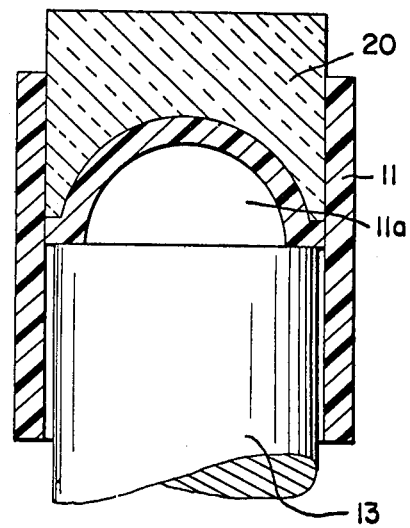
FIG. 2 is a sectional view which shows the breaking of the button from the mold by ram pressure and movement.
Figure 3:
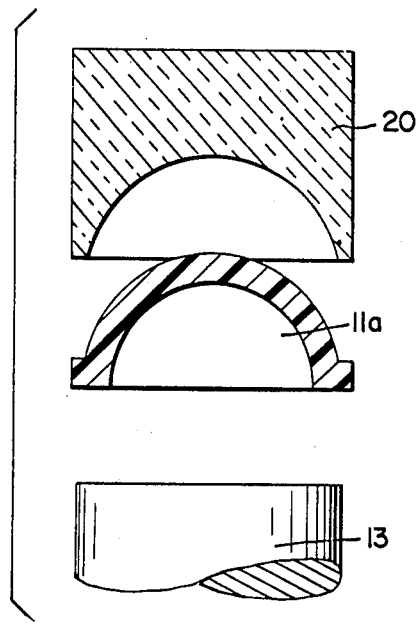
FIG. 3 is an exploded view showing separation of the break-away bottom from the button.

The bottom ejection illustrated in FIGS. 2 and 3, shows break-away frangible section 11f in annular shape which serves as the means for permitting movement of dome portion 11d with the concave surface of the button. The ram 13 is positioned so that its diameter fits precisely under frangible positions 11f for free expulsion of the button (see FIGS. 2 and 3).

LENS IMPROVEMENTS BASED UPON ADAPTING HARD-LENS GRINDING TECHNOLOGY USED FOR GRINDING THE NEW COMPOSITION

Figure 5:
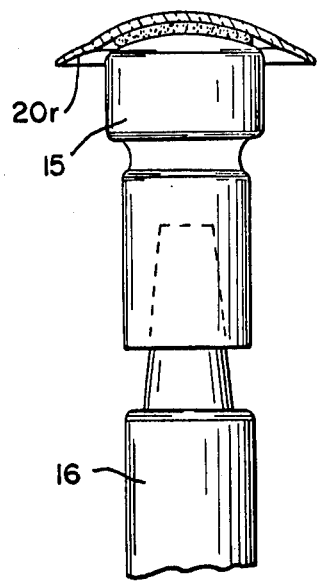
FIG. 5 shows the mounting of the lense for cutting in stages 4a, 4b and 4c, with a coventional hard lense lathe of the type shown in FIG. 6 and 9 of Mullen, U.S. Pat. No. 2,330,837.
Figure 6:
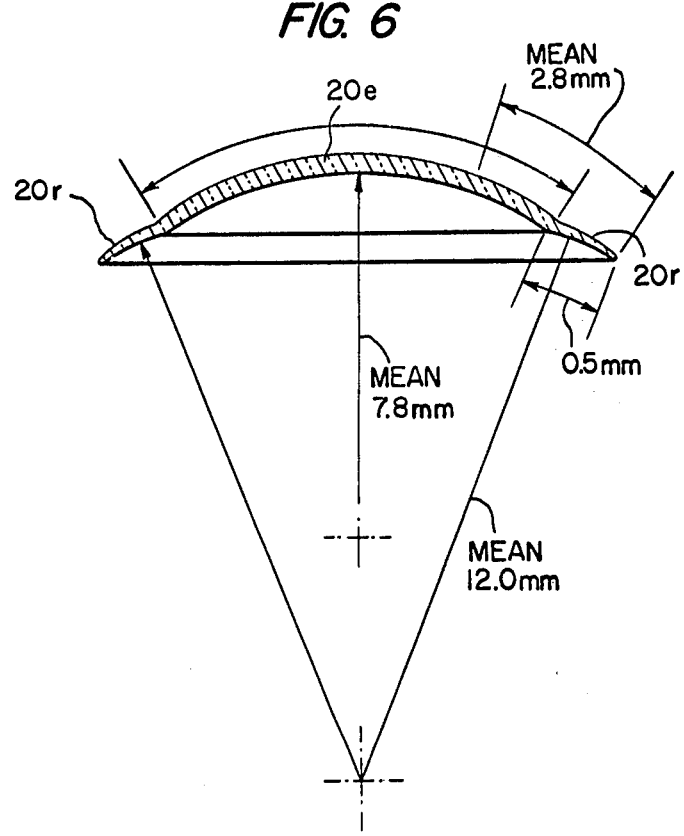
FIG. 6 shows the finished lense with the rim cut after the cutting stage in FIG. 4d, this rim cut being illustrated in FIG. 5.

As shown in FIGS. 5 and 6, the hard-lens cutting and grinding technology of Mullen U.S. Pat. No. 2,330,837 permits the hard guasi-rubbery buttons to be accurately cut and ground and polished in the dry state by the same experienced personnel who fit hard contact lens. However, only on optically corrective surface is present for cutting in accordance with the invention and this method of cutting only the outer surface provides a superior lens which requires only an inner rim cut, shown at 20r in FIG. 5 and is in an area of the lens which is non-correcting.

Obviously the invention contemplates the use of a modified form of break-away curved bottom in the mold which will have the rim cut dimension put in the mold part and for more automated manufactoring this method of casing and mold contour formation is part of the present invention.

Figure 7:
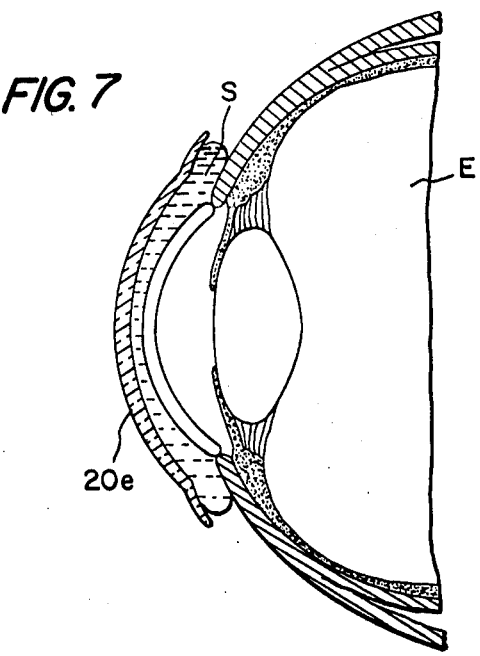
FIG. 7 shows the mounting of the lense of FIG. 5 on the eye with space between the rim and sclera before evaporation contracts the lense.
Figure 8:
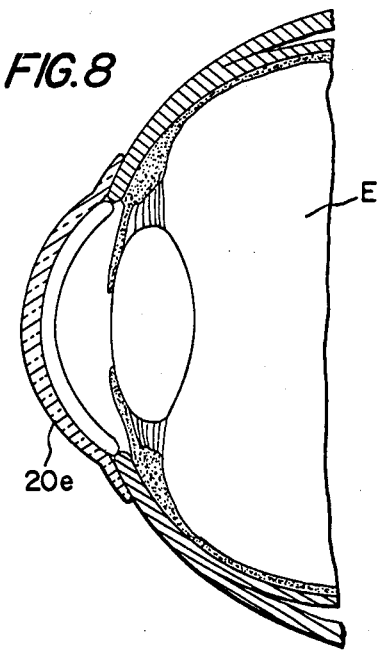
FIG. 8 shows lense of FIG. 7 after contractile evaporation.

The importance of the rim, which can be prescription ground to meet the various requirements of scleral slope encountered by precise examination or which can be molded as explained, can be seen by the comparison of views in FIGS. 7 and 8. The lens 20e has just been put back on the mounting chuck 15 which is carried on the lathe spindle 16 of the conventional machine in the Mullen patent. This view illustrates a finishing polish step of the convex surface after this rim has been made. The terminology herein defining "rim cut" relates to both the "rim cut" casting or that which has been trimmed by cutting.

In FIG. 7 the lens 20e is shown in the stage just after removal from isotonic saline and being placed on the eye. Under the rim 20r of the lens, the tear fluid flows freely and contractile forces based upon evaporation of water begin their effect. The exposed outer surface of the lens 20e loses water from a range of 50 – 65% $H_2O$ down to 45 – 50% $H_2O$ and the rim 20 thereby moves downwardly and inwardly gripping the sclera and thereby entrapping a liquid film of tear fluid, thereunder the contracted form is shown in FIG. 8.

EXAMPLES SHOWING SCOPE OF PROPORTIONS IN TABLES 1 AND 2

The following examples illustrate the scope of initial proportions of the new compositions used for static casting in the curved-bottom molds of the O'Driscoll patent as well as in the disposable break-away bottom molds of the present invention.

This mixing technique is identical with that in the O'Driscoll patent, care being taken not to entrap air and to degas the mixture under vacuum and bleeding nitrogen gas back into the system.

The two tables below summarize the compositions which provide reproducibility and predictability. Table 1, illustrates the fomulations which have been completely analyzed, the EDMA. HEMA, MA all being done by gas-liquid chromatography, (GLC) with HQ and MEHQ being done by titration and beingdouble checked by GLC. The water content was determined by Karl Fisher's method. All values in the tables below are on a weight basis. The PVP in these tables is Plasdone C, (K=30) and in its place PVP (K=15) or (K=90) can be used but best results are achieved with Plasdone C, for the reason that greater uniformity in dryness of the material, supplied by the manufacturer, is found as a result of testing.

The water content in Table 1 is based upon testing average of about 500 samples of Plasdone C, averaging 3 – 3.5% water, since the Plasdone C content varies from about 15 to about 28% (spread of 2%) of the present composition for contact lenses, the average contribution of water in the mixture is less than 1% and that Table is entitled substantially dry (less than 1%).

Table 2 illustrates the addition of 5% of water to HEMA. All water, in both tables 1 and 2, determinations are made by testing "dry" and before and after additions of water and all ingredients added to the mixture are tested in the same way. Surprisingly and unexpectedly the EDMA content is raised by 1% as a result of the addition of 5% of water and thus increase is reflected in Table 2 and emphasized by the notation (asterisk) after EDMA.

TABLE 1

| SUBSTANTIALLY DRY (LESS THAN 1% $H_2O$) | | | |
|---|---|---|---|
| Ingredient | Series A | Series B | Series C |
| HEMA | 79.3 | 77.8 | 71.8 |
| PVP (K=30) | 15.0 | 20.0 | 28.0 |
| EDMA | 3.2 | 0.7 | 0.1 |
| MA | 2.5 | 1.5 | 0.1 |
| $H_2O$ | less than 1 | less than 1 | less than 1 |
| HQ or MEHQ | 50–100 ppm | 50–100 ppm | 50–100 ppm |

TABLE 2

| 5% $H_2O$ ADDED TO HEMA | | | |
|---|---|---|---|
| Ingredient | Series E | Series F | Series G |
| HEMA | 74.3 | 72.9 | 67.2 |
| PVP (K=30) | 14.25 | 19.0 | 26.6 |
| EDMA* | 4.04 | 1.67 | 1.1 |
| MA | 2.40 | 1.43 | 0.1 |
| $H_2O$ | 5 | 5 | 5 |

TABLE 2-continued

| 5% $H_2O$ ADDED TO HEMA | | | |
|---|---|---|---|
| Ingredient | Series E | Series F | Series G |
| HQ or MEHQ | 50–100 ppm | 50–100 ppm | 50–100 ppm |

In all of the preparations of Series A, B, C, E, F and G the first stage initiators were the three mentioned in O'Driscoll U.S. Pat. No. 3,700,761 and the second stage initiator was benzoyl peroxide. This invention is limited to these initiators, e.g. the first stage are: disecondary butyl peroxy dicarbonate, cyclohexanone peroxide and acetyl peroxide. First and second stage initiators are used at a concentration of 0.05 to 0.15% by weight of the batch.

UTILITY OF DIFFERENT COMPOSITION FOR SPECIAL LENS MANUFACTURE

In Table 1, series B and in Table 2, series F represent the best groups for simple corrective hydrated lens which meet 90% of the connections in near-sightedness, far sightedness and minor astigmatigmatism (less than 2.0 diopters). As shown in FIGS. 6 – 8 for a minus lens, the lens extends beyond the cornea, the distance beyond the limbus being from about 0.5 – 2.0 mm. and the overall diameter varying from about 13.5 – 15.5 mm. and the inner rim being beveled in a flat curve in a width of 0.30 – 0.70 mm., preferably 0.35 – 0.40 mm. The same rim is used with the plus lens.

Center thicknesses in the minus lens in the dry state very from 0.30 mm. to about 0.16 mm., depending upon the power. Thinner lenses are more highly corrected and these are made from Series C and G in the Tables 1 and 2. Center thicknesses in the plus lenses vary from 0.30 mm. up to 0.45 mm., depending upon the power and the thicker lenses are the highly corrected ones which can be made from Series A, B, E or F compositions in Tables 1 and 2.

Astigmatic lenses with minus correction can be cast ground by the hard lens technology of Feinbloom, U.S. Pat. No. 3,227,507, but the selection of the composition is important since the cylindrical correction may be cast into the inner or bottom surface of a special mold may be made and used with Series G and C in accordance with the elliptical shapes taught in Feinbloom. The result of cutting the outer surface as the lathe as to provide a very thin and fragile center of the prescription ground lens which must have flexibility and rubber-like properties when dry. The strongest thin lenses which can be made are based upon the more rubbery compositions having a higher PVP content, thus the Series C and Series G compositions would be selected, depending upon whether the patient had a "dry eye" to fit or the normal "wet eye". Manifestly, Series G provides better fitting for the dry eye and series c provides better fitting for the wet eye.

In production, grinding rates are higher and manufacturing time schedules are more easily met by Series A and E since these Series provide harden buttons (higher EDMA content) and for plus lenses much higher production schedules can be met.

For dispensing of medication, Series E - G are obviously more effective, the higher water content accommodating greater total dosages of sparingly soluble eye medicaments.

The water soluble medicaments from O'Driscoll et al., U.S. Pat. No. 3,700,761 can be incorporated in the HEMA by dissolving in $H_2O$ and by adding 5% of $H_2O$ to the HEMA; especially useful lenses are made in this manner to provide hydrated lens which contain 60 – 65% H₂O, as against 55 – 60% H₂O when the 5% H₂O addition is omitted. With 5% added H₂O the lens after hydration is more spongy, and can release medication more effeciently. Uniquely precision reproducibility and predictability, dry to wet, and resistance to storage creep in long time saline storage (2 weeks to one year) is achieved only with the narrow range of formulations of the present invention.

The preferred ophthalmologically acceptable medicaments are known and include corticosteroids, sulfonamide, disinfectants, antiseptics, penicillin, pilocarpine, belladonna, dibenzyline, hydergine, methacholine, carbachol, bethanechol and the like.

It should be emphasized that the foregoing examples are the result of thousands of formulations, tested completely in the laboratory, and then on patients under the supervision of qualified ophthalmologists, these results had to be interpreted in the light of a host of parameters and only experience showed the relationship which are summarized above, in conjection with HEMA as the major ingredient. There is not predictability from HEMA to HPMA (hydroxypropyl analogue) and there is no basis for reproducing water uptakes at 50 – 65% in hydrated lenses with any other monomer than HEMA. These parameters, in addition to the composition, include the batch size contents of all ingredients as listed; time of mixing, induction period, viscosity changes, heat transfer, presence of convection currents etc.

Although certain preferred embodiments of eye bandage containing medicaments have been described herein above in terms of hard polymer formed by adding up to 5% water and subjecting the composition to the stages of induction for 2 ½ – 6 hours, first stage initiation at 40° C and second stage initiation at 110° C for 1 ¼ – 4 hours, it is emphasized that changes in manufacture can be made, for example, cutting down the time at 110° C to ¼ hour to prevent excessive drug decomposition and to thereby provide drug dispensing solid precisely cut products for any type of known medication which are specifically adapted for topical administration. For example, using the same lathe as in the Mullen Patent a shealth or a tube may be turned for encircling a blood vessel to which a slow-release water soluble drug is administered to reduce blood pressure. A sheath may be encircled about a nerve bundle or about a bone and medication administered to aid in repair and bone growth (calciferol for example). Since hydration occurs in saline, the implant which is at the same osmotic pressure as body tissues and as blood contains, in the same electrolyte environment, a very precisely dosed amount of drug which can be used to produce a degree of precision in dosage not heretofore obtainable. If the drug is used for the eye where a high degree of precision of drug dosage is needed, it may be preferable to set up a fountain solution in saline which drops the saline solution containing the drug onto the lens to deliver the dosage to the eye at a constant rate for a controlled time. Obviously, fountain supplies of this type may be used with other implants.

It is therefore seen that new compositons of the invention create new articles of commerce which are hygroscopic buttons in hard form and are cast from new and disposable molds with break-away bottoms. The buttons can be turned on a lathe to make new shaped products such as implants and contact lenses which are adapted to be hydrated in saline for water uptake of 50 – 65%. These disposable molds from hard products whose inner surfaces are free from fissures and cracks and which resist tearing by crack propogation from these fissures.

In the foregoing specification and in the following claims, the abbreviations are as follows:

| | |
|---|---|
| HEMA | Hydroxyethyl Methacrylate |
| PVP | Poly-N-Vinyl Pyrrolidone |
| EDMA | Elthylene Glycol Dimethacrylate |
| MA | Methacrylic Acid |
| H₂O | Water |
| ppm | parts per million |
| HQ | Hydroquinone |
| MEHQ | Methyl Ether of Hydroquinone |

What is claimed is:

1. A contact lens composition which can be subjected to cutting and thereafter hydrated in a buffered saline solution to provide a dimensionally-stable contact lens and also suitable for medicament delivery to the eye having from 50 to 65% water after hydration, said composition in dry form consisting essentially of polymerized random graft copolymer containing:
   1. from 67.2% to 79.3% hydroxy ethyl methacrylate;
   2. 14.25% to 28% polyvinyl pyrrolidone;
   3. from 0.1% to 4.04% ethylene glycol dimethacrylate;
   4. from 0.1% to 2.5% methacrylic acid;
   5. from about 0.1% up to 5.0% water, and
   6. from 50 to 100 ppm of hydroquinone stabilizer;
   said composition having been polymerized in two stages;
   the first stage being carried out with a low temperature peroxide initiator effective at 40° to 60° C after an induction period modified by said hydroquinone stabilizer at 15° to 30° C for a period of 2.5 to 6 hours;
   said second stage being carried out with a high temperature peroxide initiator effective at 90° to 120° C;
   each of said low temperature initiator and high temperature initiators being present in concentrations of 0.05% to 0.15%; and
   said two stages of polymerization being carried out for a total period of at least 4 hours or longer.

* * * * *